United States Patent Office 3,156,697
Patented Nov. 10, 1964

---

3,156,697
PYRIDYLCOUMARINS
Robert B. Moffett, Kalamazoo, Mich., assignor to The Upjohn Company, Kalamazoo, Mich., a corporation of Delaware
No Drawing. Filed Nov. 29, 1962, Ser. No. 241,040
21 Claims. (Cl. 260—295)

This invention pertains to novel organic chemical compounds and is more particularly directed to novel 3-pyridyl- and 4-pyridylcoumarins which, in their free base form, are represented by the following structural formula

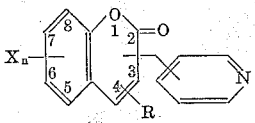

wherein R is selected from the group consisting of hydrogen, alkyl of from 1 to 4 carbon atoms, inclusive, and phenyl; X is selected from the group consisting of halogen and alkoxy of from 1 to 4 carbon atoms, inclusive; and $n$ is an integer from 0 to 3, inclusive.

The novel free base compounds of Formula I form acid addition salts with acids, which acid addition salts are contemplated as an embodiment of the invention. Likewise, novel N-oxides of the free base compounds are contemplated as an embodiment of the invention.

The novel free bases (compounds of Formula I, above), acid addition salts, and N-oxides of this invention are useful chemical compounds. They exhibit pharmacologic activity as central nervous system depressants and are useful to effect sedation in mammals, birds, and other animals when administered orally or parenterally. The compounds are also useful as ultraviolet screening agents and as optical brightening agents for textiles.

The novel 3-pyridyl- and 4-pyridylcoumarins of this invention are prepared by condensing a 2-hydroxyphenyl ketone or a 2-hydroxybenzaldehyde (i.e., a salicylaldehyde of the formula

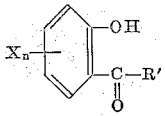

wherein X and $n$ are as defined above and R' is selected from the group consisting of hydrogen, alkyl (as defined above), phenyl, and pyridyl, with an acetic acid of the formula R''—CH$_2$—COOH (III) (or ester or anhydride thereof), wherein R'' is selected from the group consisting of hydrogen, alkyl (as defined above), phenyl, and pyridyl.

The condensation reaction is basically a variation of the Perkin reaction as described in Organic Reactions vol. I, pp. 210–265, John Wiley and Sons, Inc., New York (1942). The reaction is preferably effected with the anhydride of the acid (Formula III, above) in the presence of a basic catalyst. Illustratively, the anhydride of a pyridineacetic acid is generated in situ by employing 1 to 6 moles of acetic anhydride for each mole of pyridineacetic acid employed in the reaction. Phenylacetic anhydride can be generated in the same way. When R'' (Formula III, above) is hydrogen or alkyl the alkanoic acid and its anhydride can be used together. Suitable basic catalysts include basic amines and salts of alkali metals. Tertiary amines are preferred, and for example, triethylamine is particularly preferred. Other tertiary amines that can be used include N-methylpiperidine, N-methylmorpholine, and the like. Suitable alkali metal salts include, for example, sodium carbonate, potassium carbonate, sodium acetate, potassium acetate, sodium propionate, and the like.

When a salicylaldehyde (i.e., a compound of Formula II in which R' is hydrogen) is employed, an ester of the acid (Formula III, above, wherein R'' is pyridyl) can be used in the condensation. Suitable esters include lower-alkyl esters, for example, methyl, ethyl, and like esters. Accordingly, salicylaldehyde, alkoxysalicylaldehydes and halosalicylaldehydes within the scope of Formula II can be condensed with lower-alkyl pyridineacetates, for example, methyl 2-pyridineacetate, ethyl 3-pyridineacetate, and ethyl 4-pyridineacetate, to obtain 3-(2-, 3-, or 4-pyridyl)coumarins according to Formula I wherein I is hydrogen. Piperidine, morpholine, and the like are suitable basic catalysts when esters are used.

In accordance with the general reaction of compounds of Formula II with an acid of Formula III in the presence of a basic catalyst stoichiometric proportions of the reactants are ordinarily employed, but if desired greater or less than stoichiometric proportions of either reactant can be used. When an alkanoic anhydride is employed with a pyridine- or phenylacetic acid as described, the alkanoic anhydride is advantageously present in excess. The basic catalyst is preferably employed in about a stoichiometrically equivalent amount.

The condensation reaction proceeds over a wide range of temperatures. Any initial exothermic reaction can be followed by heating at temperatures between about 70° C. and about 200° C. in order to ensure completion of the reaction. In general, higher temperatures require less reaction time than lower temperatures.

The 3-pyridyl- and 4-pyridylcoumarins produced by the condensation reaction are recovered in accordance with conventional procedures such as evaporating the reaction medium and extracting or crystallizing the product. The compounds are substantially insoluble in water and the reaction mixture can be readily decomposed by pouring into ice water and recovering the insoluble portion. The crude product thus obtained can be further purified by well-known procedures for purifying organic compounds such as solvent extraction and crystallization, and by sublimation at reduced pressures.

Alternatively, 4-pyridylcoumarins according to Formula I wherein R is hydrogen, phenyl, or alkyl are prepared by condensing a phenol of the formula

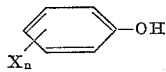

wherein X and $n$ are as defined above with an alkyl β-oxopyridinepropionate of the formula

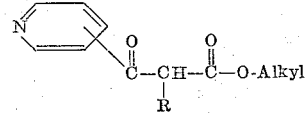

wherein R is as defined above. This condensation is advantageously carried out in the presence of acid and with or without a solvent. Suitable acids for this reaction include polyphosphoric acid, sulfuric acid, and like acids. The product is recovered by conventional methods.

Phenols in accordance with Formula IV are known or can be prepared by conventional methods. Some of the known phenols useful in accordance with the synthesis include m-butoxyphenol, o-isopropoxyphenol, 2,3,4-trimethoxyphenyl, 3,4-diethoxyphenol, and m-methoxyphenol.

The alkyl β-oxopyridinepropionates of Formula V are readily prepared by a Claisen condensation of alkyl picolinates, nicotinates, and isonicotinates with alkyl esters of the formula

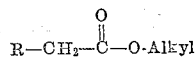

wherein R is as defined above, according to the procedure described by Gilman and Broadbent, J.A.C.S. 70, 2755 (1948).

Novel acid addition salts of the free base compounds of Formula I above are prepared by acidifying the free base in aqueous medium with a desired acid, illustratively, a pharmacologically acceptable organic or inorganic acid, for example, hydrochloric, hydrobromic, sulfuric, phosphoric, tartaric, citric, acetic, succinic, and like acids. Salts of these and even toxic acids are useful in purifying the free bases.

The free base compounds of Formula I can be reacted with fluosilicic acid to form fluosilicate salts in accordance with U.S. Patents 1,915,334 and 2,075,359. The amine fluosilicate salts thus obtained are effective as moth-proofing agents. The compounds can also be used in accordance with U.S. Patents 2,425,320 and 2,606,155 to form amine thiocyanate-formaldehyde condensation products for use as pickling inhibitors.

The novel N-oxides of the novel 3-pyridyl- and 4-pyridylcoumarins of this invention are prepared by reacting a 3-pyridyl- or 4-pyridylcoumarin with a peroxidizing agent, for example, hydrogen peroxide, perbenzoic acid, perphthalic acid, peracetic acid, persulfuric acid, and permonosulfuric acid (Caro's acid). The reaction is advantageously carried out in a solvent, illustratively, glacial acetic acid, aqueous acetic acid, ethanol, and aqueous ethanol. The reaction proceeds satisfactorily at about 70° C.; however, higher or lower temperatures can be used. The N-oxides are separated from the reaction mixture and recovered in pure form by conventional procedures such as filtration, solvent evaporation, solvent extraction, and crystallization.

The following examples are illustrative of the process and products of the present invention, but are not to be construed as limiting.

PREPARATION 1

Methyl β-Oxo-4-Pyridinepropionate

To a 12-liter, 3-necked, round-bottom flask equipped with stirrer, thermometer, a 12″ Vigreaux distilling column, and a heating mantle was added 1458 ml. of 25% sodium methoxide in methanol, 1.5 l. of toluene, and 4.5 l. of dry benzene. The solution was heated to 57° to 60° C. and the methanol was slowly distilled (volume of distillate, 1350 ml.). The distilling column was replaced with a reflux condenser, an addition funnel was affixed to the flask, and 616.8 g. (4.5 moles) of methyl isonicotinate and 666.6 g. (9.0 moles) of methyl acetate were added over an interval of 2½ hrs. while the reaction mixture was maintained at the reflux temperature. Refluxing was continued for about 15 hrs. After cooling the reaction mixture to room temperature and filtering, the filter cake was rinsed with 900 ml. of benzene and 900 ml. of Skellysolve B (isomeric hexanes having a boiling range of 140° to 160° F.). The filter cake was then dissolved in 18 l. of water, and the aqueous solution having pH 10 was neutralized to about pH 7 with 375 ml. of glacial acetic acid. The neutralized aqueous solution was then extracted with four 6-1 portions of ether. The ether extracts were combined, dried over anhydrous sodium sulfate, filtered, and the sodium sulfate on the filter was rinsed with ether. The ether rinse was added to the filtrate and the ether was evaporated. The residue thus obtained was dissolved in 600 ml. of boiling ethanol. The ethanolic solution was concentrated to about 225 ml. and the methyl β-oxo-pyridinepropionate crystallized. It had a melting point of 65° to 68° C.

Following the same procedure but substituting methyl propionate, methyl butyrate, methyl isocaproate, and methyl phenylacetate for methyl acetate, there can be prepared methyl α-methyl-, methyl α-ethyl-, methyl α-isobutyl-, and methyl α-phenyl-β-oxo-4-pyridinepropionate, respectively.

EXAMPLE 1

Preparation of 7-Methoxy-4-(4-Pyridyl)Coumarin

A mixture consisting of 18.0 g. (0.1 mole) of methyl β-oxo-4-pyridinepropionate (Preparation 1, above), 12.4 g. (0.1 mole) of m-methoxyphenol (redistilled), and 75 g. of polyphosphoric acid was warmed until exothermic reaction began. The temperature of the reaction mixture increased to about 100° C., but further increase in temperature was prevented by cooling in an ice bath. After the exothermic reaction had subsided, the temperature of the reaction mixture was held between about 70° C. and 90° C. for 20 min. The reaction mixture was then dissolved in about 200 ml. of water at 50° C. The acidity of the solution was adjusted to about pH 5 with aqueous sodium hydroxide while being cooled. A red solid separated. The solid was collected on a filter, washed with water, and dried to give 20.3 g. of a dark red solid having a melting point of 182° to 191° C. The dark red solid was heated at 200° C. and 0.001 mm. of mercury pressure, and a tan solid weighing 9 g. sublimed. The tan solid had a melting point of 202° to 209° C. After recrystallization from 1.5 l. of absolute ethanol there was obtained 7.9 g. of 7-methoxy-4-(4-pyridyl)coumarin as white crystals having a melting point of 212° to 214.5° C.

*Analysis.*—Calcd. for $C_{15}H_{11}NO_3$: C, 71.14; H, 4.38; N, 5.53; O, 18.95. Found: C, 71.03; H, 4.41; N, 5.79; O, 19.61.

Following the same procedure but substituting methyl α-methyl-, methyl α-ethyl-, methyl α-isobutyl-, and methyl α-phenyl-β-oxo-4-pyridinepropionate for methyl β-oxo-4-pyridinepropionate, there can be prepared 7-methoxy-3-methyl-, 7-methoxy-3-ethyl-, 7-methoxy-3-isobutyl-, and 7-methoxy-3-phenyl-4-(4-pyridyl)coumarin, respectively.

PREPARATION 2

3,4,5-Trimethoxyphenol

A slurry of 125 g. (0.68 mole) of 3,4,5-trimethoxy-aniline in 1,050 ml. of water was acidified with 145 ml. of concentrated sulfuric acid and cooled to about 0° C. in a briny ice-bath. A solution of 47.3 g. (0.68 mole) of sodium nitrite in 250 ml. of water was introduced, slowly with stirring and beneath the surface, during an interval of ½ hr. After stirring the reaction mixture for ½ hr. at a temperature range of 0° to 5° C. it was heated on a steam bath with stirring until evolution of nitrogen ceased (about ½ hr.). After cooling overnight in a refrigerator, the solid that separated was collected on a filter and washed with a small amount of water. The solids recovered from two runs, as above, were combined and recrystallized from 1.2 l. of methanol (with decolorizing charcoal treatment). There was thus obtained 122.1 g. (48.5% yield) of 3,4,5-trimethoxyphenol as yellow crystals having a melting point of 146° to 149° C.

EXAMPLE 2

Preparation of 5,6,7-Trimethoxy-4-(4-Pyridyl)Coumarin

A mixture consisting of 1.84 g. (0.01 mole) of 3,4,5-trimethoxyphenol (Preparation 2, above), 1.8 g. (0.01 mole) of methyl β-oxo-4-pyridinepropionate, and 5 ml. of 75% (by weight) aqueous sulfuric acid was stirred and shaken for 8 hrs. before setting aside to stand for 2 days. The red solution thus obtained was poured into ice water and made basic with aqueous sodium hydroxide. A precipitate that formed was collected on a filter, washed with water, and dried to yield 2.5 g. (80% yield) of a tan solid having a melting point of 182° to 184° C. The solid was recrystallized from 40 ml. of absolute ethanol to give 2.27 g. of 5,6,7-trimethoxy-4-(4-pyridyl)coumarin as white crystals having a melting point of 183° to 186° C.

*Analysis.*—Calcd. for $C_{16}H_{15}NO_5$: C, 65.17; H, 4.83; N, 4.47. Found: C, 65.06; H, 4.87; N, 4.60.

PREPARATION 3

4,5,6-Trimethoxysalicylaldehyde

To a mixture consisting of 30.4 g. (0.2 mole) of phosphorus oxychloride and 26.8 g. (0.17 mole) of N-methylformanilide was added with stirring, during an interval of 40 min., 36.4 g. (0.187 mole) of 3,4,5-trimethoxyphenol (Preparation 2, above). The temperature of the reaction mixture tended to increase, but it was maintained at about 25° C. by cooling. After stirring for 3¼ hrs. and standing overnight, the red reaction mixture was poured into 1 liter of ice water. After thorough mixing, a yellow solid that separated was collected on a filter and dried. It weighed 27.9 g. The solid was dissolved in 75 ml. of hot benzene and, on cooling, 7.5 g. of the starting 3,4,5-trimethoxyphenol crystallized. The filtrate was evaporated to dryness and the solid thus obtained was crystallized from a mixture of 70 ml. of methanol and 20 ml. of water to give 14.6 g. of 4,5,6-trimethoxysalicylaldehyde having a melting point of 63° to 65° C.

EXAMPLE 3

Preparation of 5,6,7-Trimethoxy-3-(3-Pyridyl)Coumarin

A solution of 10.61 g. (0.05 mole) of 4,5,6-trimethoxysalicylaldehyde (Preparation 3, above) and 9.15 g. (0.075 mole) of 3-pyridineacetic acid in 25 ml. of acetic anhydride and 7 ml. (0.05 mole) of triethylamine was heated with stirring on a steam bath for 1½ hrs. in an atmosphere of nitrogen. The reaction mixture was then heated in an oil bath at a temperature of 174° C. for an additional 1½ hrs. Most of the solvent evaporated, and the dark reaction mixture was poured into ice water. A gummy precipitate separated. The ice-water mixture was washed with ether and neutralized with aqueous sodium hydroxide. The resulting precipitate was collected on a filter, dried, and then heated at 185° C. and 0.01 mm. of mercury pressure. About 2 g. of a yellow solid sublimed and was recovered. The yellow solid was recrystallized from ethanol to give 1.5 g. of 5,6,7-trimethoxy-3-(3-pyridyl)coumarin as white crystals having a melting point of 150.5° to 153.5° C.

*Analysis.*—Calcd. for $C_{17}H_{15}NO_5$: C, 65.17; H, 4.83; N, 4.47. Found: C, 65.06; H, 4.62; N, 4.46.

Following the same procedure, but substituting 4-ethoxy-salicylaldehyde, 3-butoxysalicylaldehyde, and 4,6-dimethoxy-salicylaldehyde for 4,5,6-trimethoxysalicylaldehyde, there can be prepared 7-ethoxy-, 8-butoxy-, and 5,7-dimethoxy-3-(3-pyridyl)coumarin, respectively.

EXAMPLE 4

Preparation of 7-Methoxy-4-Methyl-3-(3-Pyridyl)-Coumarin

A solution of 33.2 g. (0.2 mole) of 2'-hydroxy-4'-methoxy-acetophenone and 27.8 g. (0.2 mole) of 3-pyridineacetic acid in 56.4 ml. (0.6 mole) of acetic anhydride and 28 ml. (0.2 mole) of triethylamine was heated and refluxed with stirring for 18 hrs. The reaction mixture was cooled and poured into ice water. Neutralization of the ice-water mixture with aqueous sodium hydroxide caused the separation of a partly crystalline solid. The ice-water mixture was extracted successively with benzene and methylene chloride. Each extract was washed successively with aqueous sodium carbonate and water, and the extracts were combined and evaporated. The dark oil thus obtained weighed 59 g. and, on standing, crystals formed. Upon heating at 190° C. and 0.02 mm. of mercury pressure, 33 g. of solid product sublimed. The solid was recrystallized from about 150 ml. of ethanol to give 27 g. (51% yield) of 7-methoxy-4-methyl-3-(3-pyridyl)coumarian as light yellow crystals, having a melting point of 138° to 141° C.

*Analysis.*—Calcd. for $C_{16}H_{13}NO_3$: C, 71.90; H, 4.90; N, 5.24. Found: C, 71.70; H, 4.79; N, 5.06.

Following the same procedure, but substituting 2'-hydroxy-acetophenone, 2-hydroxybenzophenone, 2'-hydroxy-4'-methoxy-propiophenone, 2'-hydroxy-4'-methoxybutyrophenone, and 2'-hydroxy-4'-methoxyvalerophenone for 2'-hydroxy-4'-methoxy-acetophenone, there can be prepared 4-methyl-, 4-phenyl-, 4-ethyl-7-methoxy-, 7-methoxy-4-propyl, and 4-butyl-7-methoxy-3-(3-pyriyl)coumarin, repectively.

EXAMPLE 5

Preparation of 6-Bromo-3-(2-Pyridyl)Coumarin

To a mixture consisting of 17.4 g. (0.1 mole) of 2-pyridineacetic acid hydrochloride, 20.1 g. (0.1 mole) of 5-bromosalicylaldehyde, and 75 ml. of acetic anhydride was added 28 ml. (0.2 mole) of triethylamine. An exothermic reaction began and the reaction mixture became warm and darkened. After the initial reaction subsided, the mixture was heated and refluxed with stirring for 18½ hrs. The reaction mixture was cooled and poured into water. A dark gum separated. The gum was boiled with ether and the insoluble material was further boiled with acetone. The ether and acetone solutions were combined and the organic solvents were evaporated. The residue thus obtained was heated at 160° to 170° C. and 0.01 mm. of mercury pressure, and a yellow solid sublimed. The yellow solid was recrystallized from absolute ethanol to give 7.34 g. of 6-bromo-3-(2-pyridyl)-coumarin having a melting point of 187.5° to 188.5° C.

*Analysis.*—Calcd. for $C_{14}H_8BrNO_2$: C, 55.65; H, 2.67; Br, 26.45; N, 4.64. Found: C, 55.74; H, 2.45; Br, 26.34; N, 4.82.

EXAMPLE 6

Preparation of 6-Bromo-3-(3-Pyridyl)Coumarin

A solution of 20.1 g. (0.1 mole) of 5-bromosalicylaldehyde, 30.2 g. (0.2 mole) of methyl 3-pyridineacetate, and 11.6 ml. of piperidine in 250 ml. of absolute ethanol was heated and refluxed with stirring for 3 hrs. A solid began to separate after the first hour. After standing overnight, the solid was collected on a filter, washed with ethanol, and dried to give 17.5 g. of 6-bromo-3-(3-pyridyl)coumarin as fluffy white crystals having a melting point of 230° to 231° C. Concentrating and refluxing the filtrate for an additional 4 hrs. followed by filtration, washing, and drying produced an additional 9.3 g. of 6-bromo-3-(3-pyridyl)coumarin having the same melting point. Recrystallization from methyl Cellosolve (monomethyl ether of ethylene glycol) did not change the melting point.

*Analysis.*—Calcd. for $C_{14}H_8BrNO_2$: C, 55.65; H, 2.67; Br, 26.45; N, 4.64. Found: C, 55.80; H, 3.08; Br, 26.66; N, 4.68.

Following the same procedure, but substituting 5-bromo-3-chlorosalicylaldehyde, 3,5-dichlorosalicylaldehyde, 3-fluorosalicylaldehyde, and tribromosalicylaldehyde for 5-bromosalicylaldehyde, there can be prepared 6-bromo-8-chloro, 6,8-dichloro-, 8-fluoro-, and tribromo-3-(3-pyridyl)coumarin, respectively.

EXAMPLE 7

Preparation of 6-Chloro-3-(4-Pyridyl)Coumarin

A solution of 37.3 g. (0.24 mole) of 5-chlorosalicylaldehyde, 30.2 g. (0.2 mole) of methyl 4-pyridineacetate, and 11.6 ml. (10 g.) of piperidine in 250 ml. of absolute ethanol was heated and refluxed with stirring for 2 hrs. A solid began to separate after about the first 5 minutes of heating. After cooling the reaction mixture, the solid was collected on a filter, washed with ethanol, and dried. There was thus obtained 47.9 g. of a light cream-colored solid having a melting point of 268.5° to 271.5° C. This solid was recrystallized from 350 ml. of dimethylformamide to give 45 g. (87.5% yield) of 6-chloro-3-(4-pyridyl)coumarin as light tan crystals having a melting point of 271° to 272.5° C.

*Analysis.*—Calcd. for $C_{14}H_8ClNO_2$: C, 65.25; H, 3.13; Cl, 13.76; N, 5.44. Found: C, 65.40; H, 3.24; Cl, 13.98; N, 5.29.

EXAMPLE 8

Preparation of 3-(2-Pyridyl)Coumarin

To a mixture consisting of 17.4 g. (0.1 mole) of 2-pyridineacetic acid hydrochloride, 12.2 g. (0.1 mole) of salicylaldehyde, and 75 ml. of acetic anhydride was added, with stirring and in an atmosphere of nitrogen, 28 ml. (0.2 mole) of triethylamine. After an initial exothermic reaction had subsided, the mixture was heated on a steam bath for 2½ hrs. and then heated in an oil bath at 190° C. for 1¼ hrs. During the continued heating most of the solvent evaporated. After cooling and pouring into ice water, the mixture was made alkaline with aqueous sodium hydroxide. A dark gummy solid that separated was recovered and heated at 190 C. and 0.05 mm. of mercury pressure. There was thus obtained by sublimation 12 g. of a yellow gummy solid, which was recrystallized from 30 ml. of absolute ethanol to give 7.45 of 3-(2-pyridyl)coumarin as yellow crystals having a melting point of 140.5° to 142.5° C.

*Analysis.*—Calcd. for $C_{14}H_9NO_2$: C, 75.32; H, 4.06; N, 6.28; O, 14.34. Found: C, 95.39; H, 4.02; N, 6.35; O, 14.48.

EXAMPLE 9

Preparation of 3-(3-Pyridyl)Coumarin and Hydrochloride Thereof

A solution consisting of 13.9 g. (0.1 mole) of 3-pyridineacetic acid, 12.2 g. (0.1 mole) of salicylaldehyde, 28.2 ml. (0.3 mole) of acetic anhydride, and 14 ml. (0.1 mole) of triethylamine was heated, on a steam bath and in an atmosphere of nitrogen, for 1 hr. Heating was continued in an oil bath at a temperature of 180° to 195° C. for 2 hrs., during which time most of the solvent evaporated. On cooling, crystals formed. The crystals were collected on a filter and then dissolved, with gentle heating, in 150 ml. of dilute hydrochloric acid. The solution was filtered, and cooled to promote crystallization. The crystals of 3-(3-pyridyl)coumarin hydrochloride were collected on a filter and washed with water. The 3-(3-pyridyl)coumarin hydrochloride was converted to the free base by dissolving in dilute aqueous sodium hydroxide, and the free base was precipitated by the addition of acetic acid. The base was collected on a filter and dried. It had a melting point of 167.5° to 169° C. The free base sublimed at 170° C. and 0.01 mm. of mercury pressure, and 16.5 g. (74% yield) of 3-(3-pyridyl)coumarin having a melting point of 167.5° to 169° C. was recovered.

*Analysis.*—Calcd. for $C_{14}H_9NO_2$: C, 75.32; H, 4.06; N, 6.28; O, 14.34. Found: C, 75.33; H, 3.76; N, 6.57; O, 14.16.

Following the same procedure, but substituting 2-hydroxybenzophenone for salicylaldehyde, there can be prepared 4-phenyl-3(3-pyridyl)coumarin.

EXAMPLE 10

Preparation of 3-(3-Pyridyl)Coumarin N-Oxide

A solution of 22.3 g. (0.1 mole) of 3-(3-pyridyl)coumarin (Example 9, above) and 16 ml. of 30% hydrogen peroxide in 100 ml. of glacial acetic acid was heated in a bath at 70° C. for 16 hrs. On cooling, 3-(3-pyridyl)coumarin N-oxide crystallized. The N-oxide was recovered on a filter, washed with water, and dried at 50° C. and 0.3 mm. of mercury pressure. There was thus obtained 17.5 g. (75% yield) of 3-(3-pyridyl)coumarin N-oxide having a melting point of 276° to 278° C. The product was recrystallized from 280 ml. of dimethylformamide to give 15.7 g. of 3-(3-pyridyl)coumarin N-oxide as light tan silky needles having a melting point of 276° to 278° C.

*Analysis.*—Calcd. for $C_{14}H_9NO_3$: C, 70.29; H, 3.79; N, 5.86; O, 20.06. Found: C, 70.60; H, 3.56; N, 5.85; O, 20.23.

PREPARATION 4

2-Hydroxyphenyl 3-Pyridyl Ketone 2-hydroxyphenyl 3-pyridyl ketone can be prepared as follows: A mixture of 1 mole of phenyl nicotinate and 2 moles of anhydrous aluminum chloride is heated in an oil bath at a temperature of 150° C. for 15 minutes with stirring. After cooling, the reaction mixture is poured into ice water and the acidity adjusted to about pH 6 to 7. The mixture is extracted with chloroform. The chloroform is evaporated to obtain 2-hydroxyphenyl 3-pyridyl ketone.

EXAMPLE 11

Preparation of 3-Phenyl-4-(3-Pyridyl)Coumarin 3-phenyl-4-(3-pyridyl)coumarin can be prepared as follows: A mixture of 1 mole of 2-hydroxyphenyl 3-pyridyl ketone (Preparation 4, above), 1 mole of phenylacetic acid, 6 moles of acetic anhydride, and 1 mole of triethylamine is heated in an oil bath at a temperature of 150° C. for 5 hrs. The reaction mixture is cooled and poured into water. The aqueous mixture is made slightly basic (pH about 8) with aqueous sodium hydroxide and the product is collected on a filter and washed with water. The filter cake is extracted with chloroform, and the chloroform is evaporated to obtain 3-phenyl-4-(3-pyridyl)coumarin.

Following the same procedure, but substituting propionic acid and propionic anhydride, butyric acid and butyric anhydride, isovaleric acid and isovaleric anhydride, and caproic acid and caproic anhydride for phenylacetic acid and acetic anhydride, there can be prepared 3-methyl-, 3-ethyl-, 3-isopropyl-, and 3-butyl-4-(3-pyridyl)-coumarin, respectively.

I claim:

1. A compound selected from the group consisting of (1) free base compounds of the formula

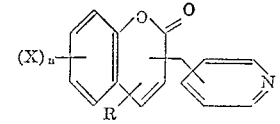

wherein X is selected from the group consisting of halogen and alkoxy of from 1 to 4 carbon atoms, inclusive; n is an integer from 0 to 3, inclusive; and R is selected from the group consisting of hydrogen, alkyl of from 1 to 4 carbon atoms, inclusive, and phenyl; (2) acid addition salts thereof; and (3) N-oxides thereof.

2. 6-halo-3-pyridylcourmarin.
3. 6-bromo-3-(2-pyridyl)coumarin.
4. 6-bromo-3-(3-pyridyl)coumarin.
5. 6-chloro-3-(4-pyridyl)coumarin.
6. 3-pyridylcoumarin.
7. 3-(2-pyridyl)coumarin.
8. 3-(3-pyridyl)coumarin.
9. 3-(3-pyridyl)coumarin N-oxide.
10. Pharmacologically acceptable acid addition salts of free base compounds of the formula

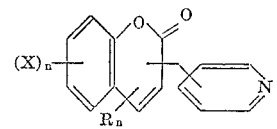

wherein X is selected from the group consisting of halogen and alkoxy of from 1 to 4 carbon atoms, inclusive; n is an integer from 0 to 3, inclusive; and R is selected from the group consisting of hydrogen, alkyl of from 1 to 4 carbon atoms, inclusive, and phenyl.

11. Acid addition salts of 3-pyridylcoumarin.
12. Pharmacologically acceptable acid addition salts of 3-pyridylcoumarin.
13. 3-(3-pyridyl)coumarin hydrochloride.
14. Monoalkoxy-4-pyridylcoumarin wherein alkoxy is of from 1 to 4 carbon atoms, inclusive and is substituted on the benzo ring.

15. 7-methoxy-4-(4-pyridyl)coumarin.
16. Trialkoxy-4-pyridylcoumarin wherein alkoxy is of from 1 to 4 carbon atoms, inclusive, and the alkoxy groups are substituted on the benzo ring.
17. 5,6,7-trimethoxy-4-(4-pyridyl)coumarin.
18. Trialkoxy-3-pyridylcoumarin wherein alkoxy is of from 1 to 4 carbon atoms, inclusive, and the alkoxy groups are substituted on the benzo ring.
19. 5,6,7-trimethoxy-3-(3-pyridyl)coumarin.
20. 7-alkoxy-4-alkyl-3-pyridylcoumarin wherein alkoxy and alkyl are of from 1 to 4 carbon atoms, inclusive.
21. 7-methoxy-4-methyl-3-(3-pyridyl)coumarin.

References Cited in the file of this patent

Culvenor "Amine Oxides" in Rev. Pure and App. Chem., vol. 3, pp. 83–114 (1953).
Bragg et al. J. Chem. Soc. pp. 5074–7 (1961).

UNITED STATES PATENT OFFICE
CERTIFICATE OF CORRECTION

Patent No. 3,156,697                      November 10, 1964

Robert B. Moffett

It is hereby certified that error appears in the above numbered patent requiring correction and that the said Letters Patent should read as corrected below.

Column 1, lines 39 and 40, for "salicylaldehyde of the" read -- salicylaldehyde) of the --; column 2, lines 10 and 11, for "wherein I is hydrogen" read -- wherein R is hydrogen --; column 3, lines 67 and 68, for "β-oxo-pyridinepropionate" read -- β-oxo-4-pyridinepropionate --; column 4, line 60, for "3.4.5-" read -- 3,4,5- --; line 74, for "$C_{16}H_{15}NO_5$" read -- $C_{17}H_{15}NO_5$ --; column 6, line 6, for "-(3-pyriyl)coumarin" read read -- -(3-pyridyl)coumarin --; column 7, line 15, for "190 C." read -- 190° C. --; line 18, for "7.45" read -- 7.45 g. --; column 8, line 49, for "6-halo-3-pyridylcourmarin" read -- 6-halo-3-pyridylcoumarin --; same column 8, lines 60 to 65, the formula should appear as shown below instead of as in the patent:

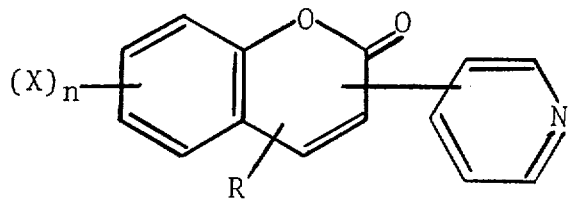

Signed and sealed this 22nd day of June 1965.

(SEAL)
Attest:

ERNEST W. SWIDER                   EDWARD J. BRENNER
Attesting Officer                  Commissioner of Patents